United States Patent Office 2,831,827
Patented Apr. 22, 1958

2,831,827

INTERPOLYMERS OF ACRYLONITRILE AND A PROCESS OF PRODUCING SAME

Heinrich Hopff, Ludwigshafen (Rhine), and Konrad Jost, Luetzelsachsen, Bergstrasse, Germany, assignors to Badische Anilin- & Soda-Fabrik Aktiengesellschaft, Ludwigshafen (Rhine), Germany No Drawing. Application February 3, 1951
Serial No. 209,328

Claims priority, application Germany February 11, 1950

17 Claims. (Cl. 260—41)

This invention relates to interpolymers of acrylonitrile and a process of producing same.

Polyacrylonitrile is eminently suited for making synthetic fibres, in particular staple fibres and rayon. The threads, contrasted with other threads from synthetic organic materials and also with threads from natural materials, such as cotton, wool or silk, can only be dyed unsatisfactorily with the known dyestuffs. The same holds good for foils and other shaped articles from polyacrylonitrile. Moreover, threads, bands and films from polyacrylonitrile tend, when in the stretched state, to split off lengthwise.

Our present invention relates to interpolymers having an acrylonitrile base which are free from the said defects. They may be dyed readily and in an inobjectionable manner, and, moreover, do not tend to splitting.

We have found that such polymers are obtained by polymerizing mixtures of preponderating amounts of acrylonitrile and minor amounts of a vinyl imidazole, such as 1-vinyl imidazole itself, vinyl methyl imidazole, vinyl ethyl imidazole, vinyl butyl imidazole and vinyl phenyl imidazole. The content of a vinyl imidazole in the interpolymers may preferably amount up to about 20%, more preferably up to 12%, the residue being acrylonitrile. The lower the percentage of a vinyl imidazole in the interpolymers, the higher is their melting point, but the less increased is their capability for being dyed satisfactorily. The best results are obtained with interpolymers of from 98 to 88 percent of acrylonitrile and from 2 to 12 percent of a vinyl imidazole.

The polymerization may otherwise be carried out in a standard fashion. The polymers obtained may be processed, for example spun, from solutions, for example in formylpyrrolidone, pyrrolidone propionitrile or dimethyl formamide, by dry or wet spinning methods, and fibres, films and other shaped articels are thus obtained which may be dyed with surprising easiness. Suitable for dyeing are, for example, acid wool dyestuffs, azo dyestuffs and their complex chromium compounds as well as triphenylmethane dyestuffs.

The following examples will further illustrate this invention but the invention is not restricted to these examples. The parts are by weight.

*Example 1*

Into a solution of 0.7 part of potassium persulfate in 200 parts of water which has been heated to 60° C. there is continuously introduced during the course of two hours, while stirring, a mixture of 32 parts of acrylonitrile, 3 parts of vinyl imidazole or of vinyl methyl or ethyl imidazole and 0.3 part of triethanolamine.

The polymerization starts immediately and is complete half an hour after the addition of the monomer mixture. After the last traces of monomer have been distilled off by heating the reaction vessel to 90° to 100° C., the polymer, which is obtained in a gritty form, is separated from water and dried.

Threads spun from the polymer from a 25% dimethyl formamide solution through a 20-hole jet into a spinning shaft heated to 110° C. and then dried, can be dyed by the processes usual in textile dyeing with the following dyestuffs: Victoria Fast Violet 2 R extra (Schultz 7th edition, vol. I, page 103), Patent Blue AE (Schultz 7 I/109), Azo Grenadin S (Schultz 7 I/105), Acid Anthracene Brown R (Schultz 7 I/145), Chrome Fast Orange R (Schultz 7 I/567), Alizarine Direct Blue A 3 G (Schultz 7 II/9), Palatine Fast Yellow G R N (Schultz 7 II/169), Palatine Fast Red R N (Schultz 7 II/169), Palatine Fast Blue G G N (Schultz 7 II/168) and others.

*Example 2*

Into an aqueous solution as specified in Example 1 there is introduced at the same temperature a mixture of 29 parts of acrylonitrile, 1 part of vinyl ethyl imidazole and 0.3 part of triethanolamine. The polymerization and processing are as described in Example 1. The polymer obtained can be dry-spun or wet-spun. The threads exhibit good strength data and can be dyed with the dyestuffs listed in Example 1.

What we claim is:

1. A process for the production of interpolymers which comprises heating an aqueous mixture of a preponderating amount of acrylonitrile and a minor amount of a 1-vinyl imidazole selected from the group consisting of 1-vinyl imidazole, 1-vinyl alkyl imidazole, and 1-vinylimidazole, in the presence of a polymerization catalyst, and recovering the resultant polymer.

2. A process as claimed in claim 1, in which the amounts of acrylonitrile range between 80 and 98 percent and of a 1-vinyl imidazole between 20 and 2 percent.

3. A process as claimed in claim 1, in which the amounts of acrylonitrile range between 88 and 98 percent and of a 1-vinyl imidazole between 12 and 2 percent.

4. A process as claimed in claim 1, in which 1-vinyl imidazole is employed.

5. Interpolymers containing a minor amount of units of 1-vinyl imidazole, the remainder of the interpolymer consisting of acrylonitrile units.

6. Interpolymers containing a preponderating amount of acrylonitrile units and a minor amount of vinyl imidazole units selected from the group consisting of 1-vinyl imidazole, 1-vinyl alkyl imidazole, and 1-vinyl phenyl imidazole.

7. Interpolymers containing 98–80% of acrylonitrile units and 2–20% of vinyl imidazole units selected from the group consisting of 1-vinyl imidazole, 1-vinyl alkyl imidazole, and 1-vinyl phenyl imidazole.

8. Interpolymers containing 98–88% of acrylonitrile units and 2–12% of vinyl imidazole units selected from the group consisting of 1-vinyl imidazole, 1-vinyl alkyl imidazole, and 1-vinyl phenyl imidazole.

9. Interpolymers containing a minor amount of 1-vinyl alkyl imidazole units and the balance of acrylonitrile units.

10. Interpolymers containing a minor amount of 1-vinyl phenyl imidazole units and the balance of acrylonitrile units.

11. A shaped article comprising a copolymer of a preponderating weight proportion of acrylonitrile and a minor weight proportion of a substance selected from the group consisting of 1-vinyl imidazole, alkyl-substituted 1-vinyl imidazoles, and phenyl-substituted 1-vinyl imidazoles, said article being dyed with an acid dye.

12. Fibers comprising a copolymer of from 80 to 98 percent by weight of acrylonitrile and from 2 to 20 percent by weight of a substance selected from the group consisting of 1-vinyl imidazole, alkyl-substituted 1-vinyl imidazoles, and phenyl-substituted 1-vinyl imidazoles.

13. A fiber according to claim 12 dyed with an acid dye.

14. Fibers comprising a copolymer of at least 88 percent by weight of acrylonitrile and at least 2 percent by weight of 1-vinyl imidazole.

15. A copolymer of from 80 to 98 percent by weight of acrylonitrile and from 2 to 20 percent by weight of 1-vinyl imidazole.

16. A copolymer of from 80 to 98 percent by weight of acrylonitrile and from 2 to 20 percent by weight of 1-vinyl methyl imidazole.

17. A copolymer of from 80 to 98 percent by weight of acrylonitrile and from 2 to 20 percent by weight of 1-vinyl ethyl imidazole.

References Cited in the file of this patent

UNITED STATES PATENTS

| | | |
|---|---|---|
| 2,491,471 | Arnold | Dec. 20, 1949 |
| 2,603,621 | Craig et al. | July 15, 1952 |
| 2,643,990 | Ham | June 30, 1953 |
| 2,688,008 | Chaney et al. | Aug. 31, 1954 |

U. S. DEPARTMENT OF COMMERCE
PATENT OFFICE

CERTIFICATE OF CORRECTION

Patent No. 2,831,827  Heinrich Hopff et al.  April 22, 1958

It is hereby certified that error appears in the printed specification of the above numbered patent requiring correction and that the said Letters Patent should read as corrected below.

Column 1, line 51, for "articels" read -- articles --; column 2, lines 27 and 28, for "1-vinylimidazole" read -- 1-vinyl phenyl imidazole --.

Signed and sealed this 8th day of July 1958.

(SEAL)
Attest:

KARL H. AXLINE
Attesting Officer

ROBERT C. WATSON
Commissioner of Patents